(12) United States Patent
Anderson

(10) Patent No.: US 6,463,026 B1
(45) Date of Patent: Oct. 8, 2002

(54) OPTICAL DISC LABEL

(75) Inventor: Collin D. Anderson, Chicago, IL (US)

(73) Assignee: Digital Innovations, L.L.C., Lincolnwood, IL (US)

( * ) Notice: Subject to any disclaimer, the term of this patent is extended or adjusted under 35 U.S.C. 154(b) by 0 days.

(21) Appl. No.: 09/847,157

(22) Filed: May 1, 2001

Related U.S. Application Data

(63) Continuation-in-part of application No. 09/652,310, filed on Aug. 31, 2000, now abandoned.
(60) Provisional application No. 60/152,069, filed on Sep. 2, 1999.

(51) Int. Cl.[7] .............................. G11B 3/70; G11B 5/84
(52) U.S. Cl. ........................................ 369/290; 369/291
(58) Field of Search .................................. 369/283, 286, 369/287, 290, 291

(56) References Cited

U.S. PATENT DOCUMENTS

| | | | |
|---|---|---|---|
| 4,879,710 A | 11/1989 | Iijima ......................... | 369/291 |
| 5,020,048 A * | 5/1991 | Arai et al. ................... | 369/291 |
| 9,477,650 * | 5/1995 | AUX | |
| 5,757,765 A | 5/1998 | Chen .......................... | 369/291 |
| 5,787,069 A | 7/1998 | Lowe et al. ................ | 369/291 |
| 6,262,969 B1 * | 7/2001 | Ito et al. ..................... | 369/291 |

FOREIGN PATENT DOCUMENTS

| | | | |
|---|---|---|---|
| AU | 9477650 | * | 5/1995 |
| EP | 0 599 655 A1 | | 6/1994 |
| JP | 6-36350 | | of 1994 |
| WO | WO 94/14161 | | 2/1994 |

* cited by examiner

Primary Examiner—David Davis
(74) Attorney, Agent, or Firm—Lloyd L. Zickert

(57) ABSTRACT

A removable and reusable writeable or printable label for an optical disc having low-tack adhesive system for attachment of the label to the label side of a disc. A liner having mechanical properties that are suitable to permit ease of handling before mounting the label onto a disc is provided on the adhesive side to protect the label while not in use. The labels may be kiss-cut from a two-ply sheet to allow the labels to be printed upon prior to their application to a disc. An applicator for mounting the label facilitates the easy orientation and proper attachment of a label to an optical disc.

10 Claims, 4 Drawing Sheets

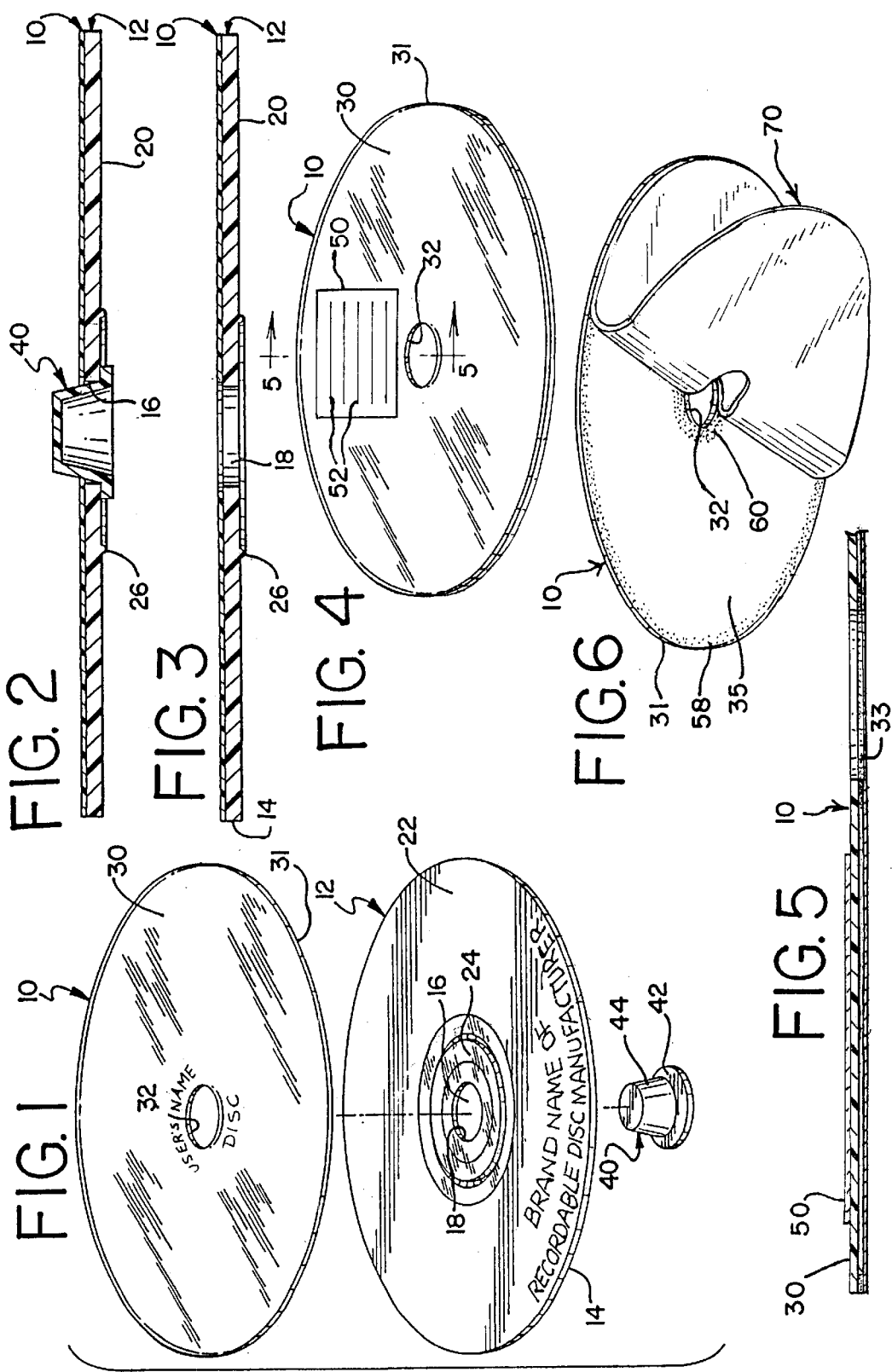

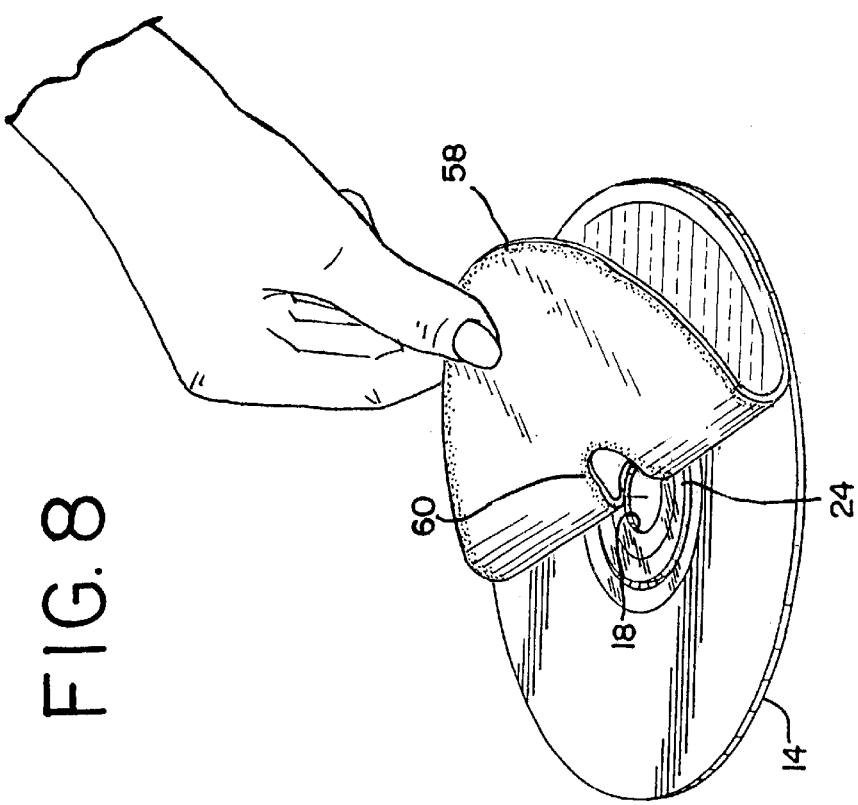
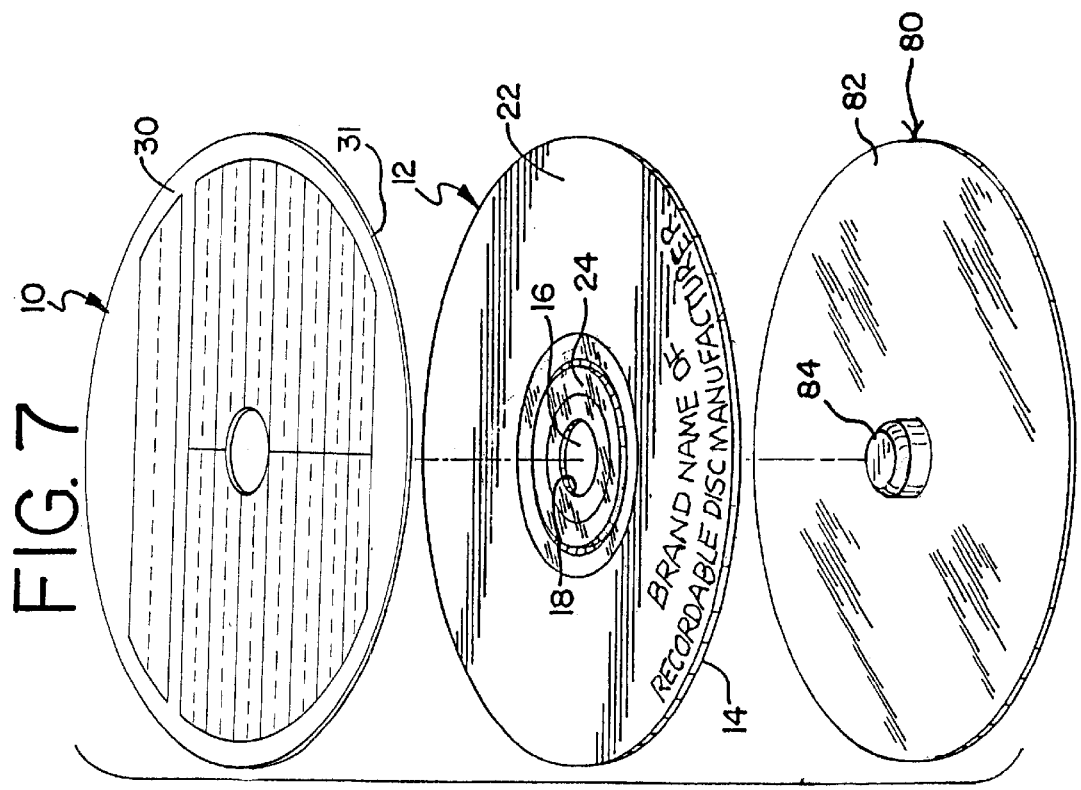

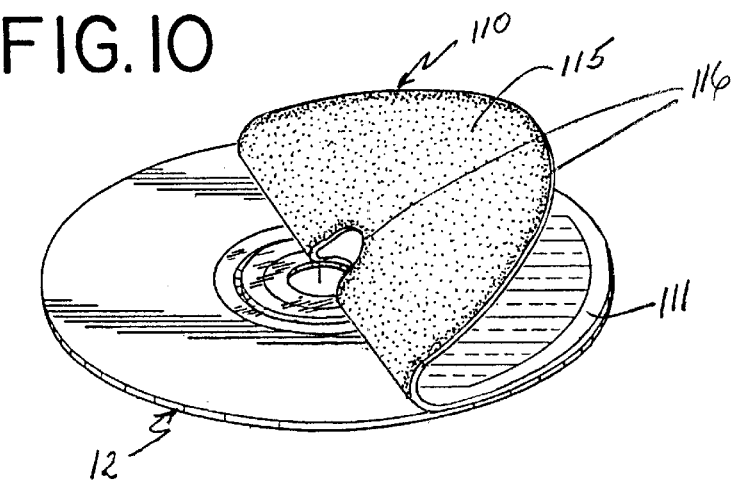
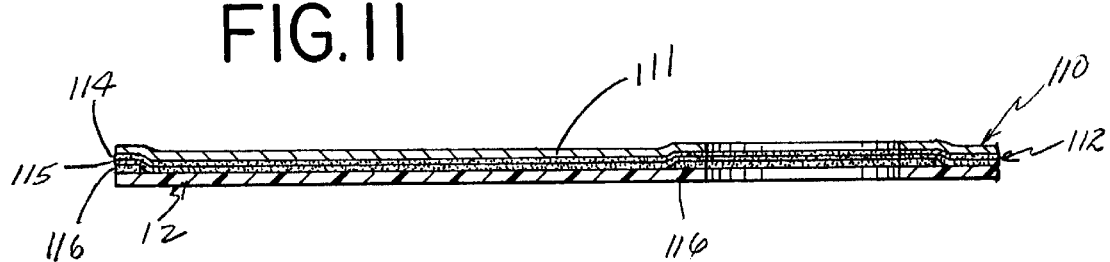

OPTICAL DISC LABEL

This application is a continuation-in-part application of my application Ser. No. 09/652,310, filed Aug. 31, 2000 abandoned, which claims the benefit of U.S. provisional application Ser. No. 60/152,069, filed Sep. 2, 1999.

DESCRIPTION

This invention relates in general to a label for an optical disc, and more particularly to a writeable or printable label for an optical disc that may be easily applied and removed and reapplied to the same or different optical disc or discarded for a new label, and a kit including a label with a liner and an applicating tool to facilitate the correct orientation of the label on an optical disc.

BACKGROUND OF THE INVENTION

Within the last several years, the use of optical or laser-readable discs has steadily increased. While initially known more for storing musical compilations (i.e., compact discs), optical discs now take many forms and store a variety of data or computer software. Examples of the many forms of optical discs include full-size video discs, compact discs and digital versatile discs.

Generally, an optical disc is a relatively thin circular disc-shaped member having an outer edge, a central aperture, and substantially flat opposing sides. An optical disc is formed in layers, with the information being stored within the optical disc and protected in such a way that it still may be read by a laser. Essentially, hundreds of millions of pits separated by spaces or lands are molded into one side of an optically transparent plastic disc. The other side of the plastic disc represents the "play side" of the optical disc. A thin reflective coating, such as a thin layer of aluminum is applied on top of the pits and lands. The aluminum layer is then coated with a hardened plastic resin which serves to protect the data side of the optical disc. A label or indicium is attached to or formed on the plastic resin layer, and this side is usually called the "label side."

Currently, prerecorded optical discs are generally sold with a preexisting label indicating the contents of the optical disc and other pertinent information. Even though the disc is already labeled, the user of the optical disc may want to include additional information on the disc, such as the user's name or favorite tracks. It is therefore desirable to have an optical disc label that allows the user to further label or relabel an optical disc. Furthermore, with the growing popularity of recordable and re-writeable optical discs, there is a demand for a label that will allow the user to correctly identify the changing contents of the optical disc.

Heretofore, it has been known to place a thin plastic protector on an optical disc using an adhesive, as disclosed in U.S. Pat. No. 4,879,710, and to use an alignment tool for mounting the protector. These optical disc protectors are transparent and sized to avoid interfering with the readability and use of the optical disc. However, these label protectors are not widely used in part because of the problems arising from the adhesive used to apply them to the optical discs. First, the adhesive makes it difficult to accurately apply the protectors to the disc. Second, once applied, the protectors are difficult to remove and/or reapply without damaging the optical disc. In fact, some commercial protectors, notably CD Scratch Guard Protectors from CD Essentials (Northridge, Calif.), carry a warning on the package that an optical disc can be damaged by attempts to remove the protector once applied. Other commercial labels, notably Avery-Dennison's White CD/DVD Labels (Product #5931), coat the entire bottom surface of the label with an adhesive. Although the products claim to be removable and replaceable, removing labels of this type that have adhesive on their entire surface will occasionally destroy the disc by pulling off part of the protective plastic resin layer.

Easy removability may be desirable if the label is improperly applied to the disc, the label becomes dirty, or if the contents of the disc change. Accordingly, there is a need for a label that may be easily applied, securely attached, easily removed without tearing and easily reattached to the same or a different optical disc. It is also important to provide a label that is removable without leaving an adhesive residue so that a replacement label will properly attach to the disc surface. There is also a need to provide an efficient and useful tool to correctly apply the labels to the disc.

Heretofore known labeling systems require multiple parts, are relatively expensive and bulky, and require offering multiple kits to serve the user. Further, they are complex and difficult to use.

SUMMARY OF THE INVENTION

The present invention overcomes the above problems in providing an easily attachable optical disc label that may be removed and discarded or remounted onto another optical disc, and which when attached to an optical disc will not interfere with playing the disc. The optical disc label consists of a circular label made of substantially opaque paper with a center hole and sized such that it covers substantially all of the label side of a disc. In order to facilitate the proper alignment on the disc and thereby not interfere with the playback of the stored data, the label has an aperture or center hole that may be slightly larger than the central aperture or center hole of the disc. In one embodiment, one side of the label includes a low-tack or repositionable adhesive applied in concentric rings around the aperture and outer periphery of the label and optionally along a plurality of radially extending areas, and which allows the label to be removably attached to the label side of a disc. In another embodiment, the label includes an adhesive system composed of a plurality of layers of repositionable adhesive, some of which would cover the entire surface of the paper layer of the label, that provides a strong bond between the paper label and the disc while permitting removal without tearing the label or leaving any substantial adhesive residue on the disc. Prior to attaching the label and for storage purposes, the low-tack or repositionable adhesive side of the label is preferably covered with a removable liner that may contain instructions or other information on its face. The label is preferably made of moisture resistant paper or paper blend and opaque, and may have a series of lines or other demarcations to assist in applying labeling information. The label includes a surface on one side that may be written on by any type of pen, pencil or marker. Additionally, the writing surface of the label may be printed on by any typewriter or computer printer, such as a laser or ink-jet printer.

Moreover, it is preferable that the label stock have good stability at high temperatures and humidity to minimize bubbling when applied to an optical disc. Further, the label stock and adhesive for attaching to an optical disc would be such as to minimize edge curling during the application of indicia by printing or otherwise and when being separated from the liner and during use on an optical disc. Further, the liner or backing sheet should be of such a material as to reduce bubbling and/or curling during the application of indicia. Preferably, the adhesive would be of a type having substantially constant strength throughout its expected life to minimize release from the disc, while being inert to the disc and functioning to release from the disc when being removed.

In order to facilitate proper alignment of the label on the disc, an alignment tool consisting of a circular base and an alignment button or post may be used. To mount the label on the disc, the disc is placed label side up over the alignment tool such that the alignment button or post extends through the central aperture or center hole of the disc. Once the liner is removed, the low-tack adhesive side of the label is then placed on top of the label side of the disc such that the aperture of the label fits over the alignment button or post. The label is then smoothly pressed onto the label side of the disc, preferably by hand, starting at the center and working outwardly until the label is securely attached to the disc and any air bubbles or wrinkles are eliminated. The alignment tool or applicator protects the play side of the optical disc when the label is applied to the label side thereof.

Although the label securely attaches to the label side of the disc, it may be removed easily by hand or by a suitable non-scratching tool by placing a fingernail or tool under the outer edge of the label and pulling up and peeling the label from the disc. Once removed, the label may be discarded or reattached to the same or a different optical disc.

It is therefore an object of this invention to provide an optical disc label that may be easily attached to an optical disc to allow a user to selectively label the disc as to its contents.

Another object of the present invention is to have an optical disc label that uses an adhesive around the center aperture and the outer periphery of the label and optionally at radially spaced areas to allow the label to be easily and securely attached and thereafter removed from an optical disc without harming the underlying data of the disc.

A further object of the present invention is to provide a label having an adhesive system composed of a plurality of layers of repositionable adhesive, some of which cover the entire paper layer or ply of the label, and which will permit removal of the label without tearing the label and not leave an adhesive residue on the disc.

It is a further object of the present invention to have an optical disc label that is substantially opaque to allow the user to selectively write or print on the label.

Another object of the present invention is to provide an alignment tool or applicator for facilitating the proper placement of the optical disc label on an optical disc, and to protect the play side of the disc during application of the label.

A further object of the present invention is to provide a labeling kit including a two-ply sheet having a label and a liner, and an applicator for orienting the label on an optical disc.

Other objects, features and advantages of the invention will be apparent from the following detailed disclosure, taken in conjunction with the accompanying drawing, wherein like reference numerals refer to like parts.

DESCRIPTION OF THE DRAWINGS

FIG. 1 is a perspective view of the optical disc label of the present invention aligned with an optical disc and the alignment tool prior to mounting the label on the disc;

FIG. 2 is a cross-sectional view of the optical disc label mounted on a disc showing the use of the alignment tool for aligning the label and the disc;

FIG. 3 is a view like FIG. 2 with the alignment tool removed;

FIG. 4 is a perspective view of a label showing a portion of the label having a top coating on the surface for inscribing indicia on the label;

FIG. 5 is a cross sectional view taken substantially along line 5—5 of FIG. 4;

FIG. 6 is a perspective view of the label with the protective liner being partially removed from the adhesive side of the label;

FIG. 7 is a perspective exploded view of the optical disc label aligned with an optical disc and a modified alignment applicator prior to mounting the label on the disc;

FIG. 8 is a perspective view of an optical disc and illustrating the manner of removing a label from the disc;

FIG. 10 is a perspective view of an optical disc with a modified label according to the invention having a different adhesive system from the previous embodiments; and FIG. 11 is a partially fragmentary enlarged and exaggerated cross-sectional view showing the multi-layered adhesive system.

DESCRIPTION OF THE INVENTION

Figure 9:
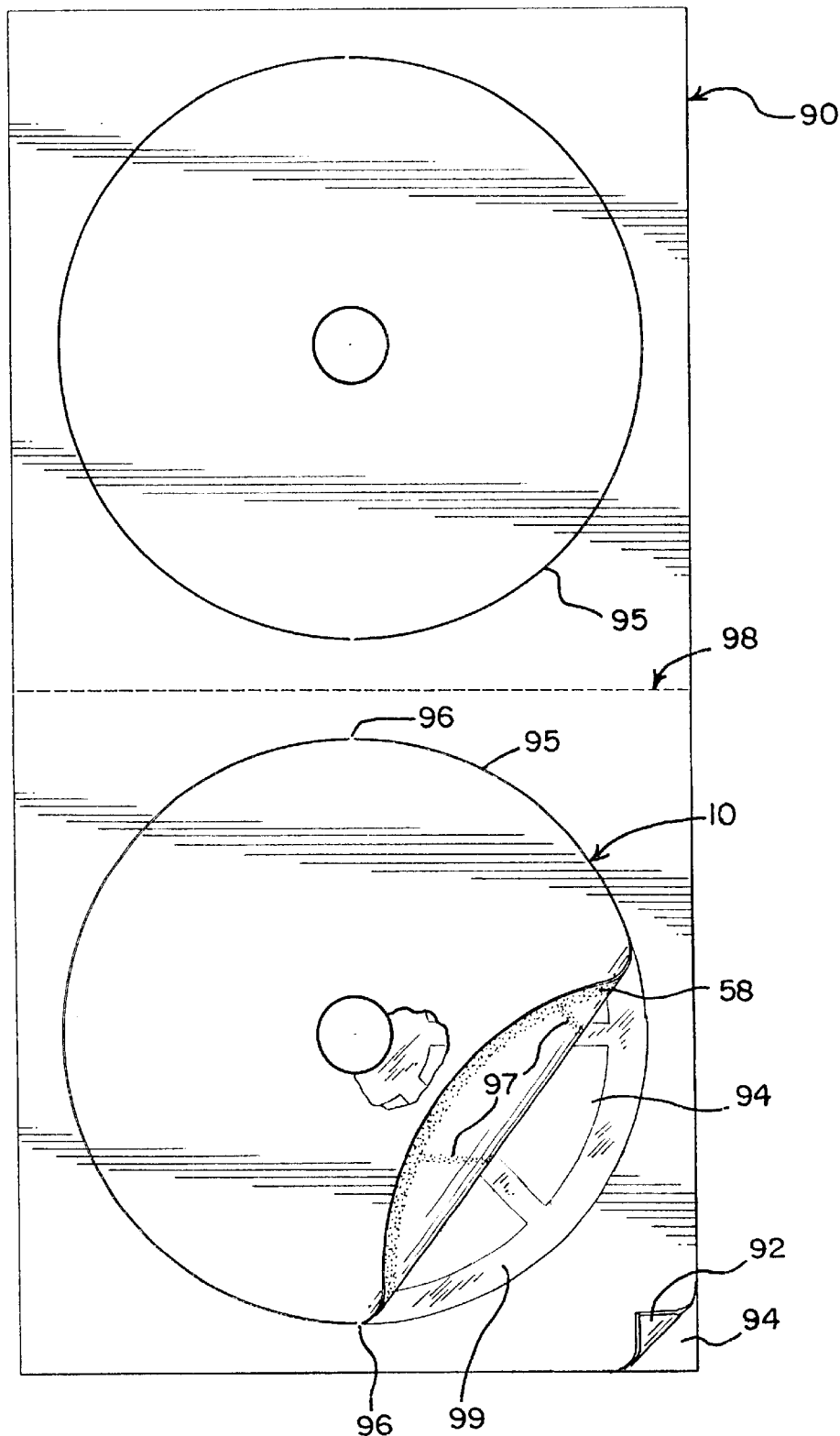
FIG. 9 is a top plan view of a sheet form with two labels for use in a printer prior to application to a disc, and illustrating an edge of one label turned up prior to removal from the label sheet.

Referring now to the drawings, an optical disc label according to the invention, generally indicated by the numeral 10, is adapted to be easily mounted on the label side of an optical disc. The optical disc 12 shown in the drawings includes a circular body having a peripheral edge 14 and a circular aperture 16. The aperture 16 is bordered by an inner edge 18 wherein the aperture 16 and the edge 18 may function to align the disc on a suitable spindle. A clamping area 24 also borders the aperture 16 and provides a surface to secure the disc 12 in a suitable playback apparatus.

The disc 12 includes a bottom surface or side 20 which constitutes the play side of the disc and a top surface or side 22 that is considered the label side of the disc. Suitable indicia 54 may be imprinted on the label side 22 of the disc 12 for identifying various information such as the data inputted on the disc. It will be appreciated that the optical disc may be of any of the suitable types that are used currently for the purpose of storing data.

The optical disc label 10 of the current invention is designed to be mounted on the label side 22 of the optical disc 12. While the label 10 is designed to allow a user to personalize the information on a disc, the label also serves to protect the label side of an optical disc from damage.

The material for the optical disc label 10 is preferably a substantially moisture-resistant opaque paper or paper blend, having a thickness of about 5 to 6 mils. A label of that thickness will allow the label to remain on the optical disc without interfering with the playback of the stored data. The label may also be of a different thickness, such as 2 mils, depending, in part, on what type of marking instrument will be used. One suitable paper stock is 28 pound bond stock from Standard Register, Inc. It is also understood that the label may be made of writeable or printable polypropylene, polystyrene or other suitable material.

As seen in FIG. 1, the label 10 includes a circular body defined by an outer peripheral edge 31, and a centrally disposed hole or opening 32 provided, in part, to facilitate the alignment of the label onto a disc. The label 10 is preferably sized to be substantially equal to the outer diameter of the disc 12, so that when mounted on the disc 12 the outer edge 31 of the label 10 will be substantially in alignment with the outer edge 14 of the disc 12. It is also preferable that the central aperture 32 of the label 10 is sized so that it will be slightly larger than the opening 16 of the disc 12 so as to avoid interference with the placement of the disc on spindles or centering members of an optical disc reading machine. While the center opening of the label is preferably slightly larger than the center hole of the disc, it should be appreciated that it could be of the same size or even substantially greater.

The side 35 of the label that is desired to be removably attached to the label side of the disc is preferably provided with a low-tack or repositionable adhesive 58 on its surface. Preferably, a repositionable acrylic-based adhesive obtainable from Standard Register Corporation that is air-dried by any suitable device. The low-tack adhesive 58 is preferably limited to concentric rings around the central aperture 32 and near the outer peripheral edge 31 on the adhesive side 35 of the label 10 such that it will not contact the preexisting label in a region where there is underlying data when the label 15 is properly applied to the disc. Further, the adhesive will preferably be of a type that will provide the necessary strength to fulfill the expected life of usage and inhibit bubbling or edge curling during use or during the application of indicia. Optionally, additional narrow radially extending areas of adhesive may be provided to provide secure attachment of the label to a disc and/or to reduce bubbling. The inner concentric ring 60 of adhesive is preferably located such that when the label is applied to the disc, the adhesive falls completely within the clamping area 24 of the disc. The outer concentric ring 62, when the label is properly applied to the disc, preferably covers an area on the top surface 22 of the disc that does not contain any underlying data. An example of a low-tack adhesive is #12 removable adhesive from Standard Register Corporation, although the repositionable adhesive of Standard Register is preferred. The adhesive preferably has a thickness between 0.8 and 1.6 mils.

In order to maintain the effectiveness of the adhesive 58 prior to using the label, the label 10 is preferably provided with a removable liner 70 that covers the adhesive side of the label during periods of non-use. It is appreciated that the liner is preferably made out of a heavy stock paper, such that it is stiff enough to be substantially self-supporting for facilitating the handling of the label before mounting the label on a disc, such as 40 pound standard liner sheet from Standard Register, Inc. However, it is known that the liner may be made out of a suitable material having mechanical properties which are sufficient enough to protect the adhesive side of the label. The liner preferably allows for information, such as instructions or advertising information, to be printed upon its surface opposite to the surface receiving the label.

As shown in FIG. 9, one or more labels 10 are provided on a sheet 90 having a top layer of material 92 for the labels adhesively secured to a bottom layer of material 94 for the liner, which is preferably 5 ½"×11" to accommodate two labels, and sized to facilitate packaging and optional printing on a computer printer. Thus, the sheet has two plies, one for forming a label of writeable or printable substantially opaque material, and the other being a liner for the adhesive side of the label to protect the adhesive before mounting on a disc. It will be appreciated that the sheet may be of any desired size and can include any number of labels. The labels 10 are kiss-cut at 95 from the top layer 92. In addition to securing the labels to the liner by a low-tack adhesive, the labels may be further secured to the top layer by one or more tie-downs 96, which are defined by breaks in the kiss-cutting and provide an easily tearable section between the label and the layer. Although a pair of diametrically opposed tie-downs 96 is shown in FIG. 9, any number and arrangement of tie-downs may be employed. The embodiment of FIG. 9, in addition to including the low-tack adhesive at the inner and outer peripheries 58 and 68, may also have adhesive at a plurality of radially extending areas 97 to enhance the attachment of a label to a disc. Further, to enhance separation of the labels from the liner, a silicone coating 99 may be applied to the surface of the liner where the adhesive of the label will engage, such as a primary silicone liner from Standard Register, Inc.

If the sheet has more than one label, the sheet may also include a perforation 98 to allow for the sheet to be folded or to be separated into individual sheets or subsheets, each including only one label. The liner may be easily peeled or removed from the label before mounting the label on a disc.

The label 10 may be made from paper, a paper blend, plastic or other suitable material. The top side 30 of the label 10 may be coated with a top coat 50, as shown in FIG. 4, to assist the user in inscribing indicia on the label. As it is desired for a user to write on the label, the top coat is preferably made out of a material that reduces the possibility of smearing. Depending on the particular desire of the user, the top coat 50 may be placed on part or all of the top side of the label. Once the top coat 50 is printed on the disc 12, lines or other indicia 52 may be printed on the top coat 50 to facilitate the marking on the label or to advertise.

To assist in mounting the label to a disc, preferably an alignment tool or applicator 80 is provided in the form of a circular disc or base 82 having a button, post or spindle 84 centered on the base and sized so that an optical disc having an aperture 16 will easily fit over the spindle. The base 82 of the applicator is preferably sized to be about the same size as an optical disc, so that it provides complete support for an optical disc, particularly when it is used as a support when a person is writing on a label applied to an optical disc. The alignment tool 80 is made of a suitable material having a rigidity similar to that of an optical disc but substantially greater than a label, such as a suitable injection moldable plastic so that adequate support for the optical disc is provided when a label is applied. For example, it may be made of a suitable low-density polyethylene.

The spindle 84 is cylindrically sized so that the central aperture 16 of an optical disc can easily fit on the spindle and of a height to permit the label to be easily oriented thereon with the optical disc when the label is applied. When the label is placed on the disc with the adhesive side facing down, the center hole of the label is placed over the spindle or post of the alignment tool or applicator with the fingers. Starting at the center of the label, any air bubbles or wrinkles between the disc and label are removed by applying pressure to the label and working toward the outer edges of the label. Once the label is in place, the alignment tool may be removed from the disc and label so that the optical disc may then be used in a normal manner. Since the base substantially completely underlies the optical disc, the play side of the optical disc is fully protected against damage or contamination during the label application operation. The post of the applicator may be of a different shape, such as frustoconical, so long as it allows the disc and label to be easily placed thereon and properly oriented on the disc.

An alternative embodiment of the alignment tool or applicator is shown in FIGS. 1 to 3. The alignment tool 40 is provided in the form of a hat and includes a bottom rim or lip 42 and a post 44 extending upwardly therefrom that is frustoconical in shape and sized to easily receive the opening or aperture 16 of a disc. The frustoconical post, being tapered, facilitates the centering of the tool as it is positioned with the optical disc. The rim 42 bottoms on the underside of the disc, as seen in FIG. 2, whereby the tool and disc can then receive the label. The tapered side wall of the post 44 facilitates the application of the label into an aligned position with the disc as the label is mounted onto the label side of the optical disc. The alignment tool may also be of a different shape so long as it allows the apertures of the optical disc and label to be easily received on the post of the alignment tool.

It will be appreciated that it is possible to mount the label without the use of an alignment tool. In this case, the user must be careful to align the label with the disc surface so that it will not interfere with the playing of the disc in a disc reader. Again, the user will need to work out and remove any possible air bubbles and/or wrinkles between the label and the optical disc so that the label is flush on the disc.

After the label has been placed on an optical disc, it can be appreciated that it will stay in place until it desired to be removed by the user. When it is desired to remove the label, the label may be peeled from the disc without the use of any tools. Tools may also be used as long as the disc is not scratched or otherwise damaged during the use of the tool. The low-tack or repositionable adhesive facilitates the reuse of the label if desired on the same or another disc. However, normally a used label will be discarded and replaced by a new label.

It should also be appreciated that a three-ply labeling unit may be provided which includes a carrier ply having permanent adhesive on one side and silicone on the other side, a label ply with a repositionable adhesive on one side for engaging the silicone side of the carrier ply and a writeable surface on the other side, and a releasable liner or backup ply on the permanent adhesive side of the carrier ply. The liner would be removed when the unit is to be used to attach the permanent adhesive side of the carrier ply to the label side of a laser disc. Alignment of the carrier ply to the disc is preferably accomplished by the applicator tool of the invention. Thereafter, the label ply may be removed from the carrier ply and exchanged for a replacement label ply. Preferably, the permanent adhesive is provided over substantially the entire side of the carrier ply for securing attachment to a disc, although it may be applied only to selected areas if desired.

Referring now to the embodiment shown in FIGS. 10 and 11, a preferred label 110 is shown and which includes a preferred adhesive system 112 composed of multiple layers of adhesive applied to the adhesive side of the writeable substrate 111 in order to provide the bonding strength desired.

The preferred adhesive system 112 includes a plurality of layers or bumps of repositionable adhesive. The first adhesive layer 114 is applied to and cured to the underside of the label substrate 111. Adhesive layer 114 is applied over the entire undersurface of the substrate 111 from the outer periphery to the inner periphery at the central opening. Following the curing of adhesive layer 114, a second adhesive layer or bump 115 is applied over the adhesive layer 114 and cured. Thereafter, a third adhesive layer or bump 116 is applied to the outer periphery of the writeable substrate 111 as well as to the inner periphery of the substrate. Preferably, the substrate is of a suitable paper stock to which the adhesive will properly adhere, and it will be appreciated the adhesive will be matched to the paper stock. This third layer of adhesive is patterned in the form of rings, as shown in FIGS. 10 and 11, wherein an inner ring is shown as well as an outer ring to provide a greater concentration of adhesive at the peripheries of the labeling substrate and a stronger bond than at the area with only the double layer of adhesive. The cross-sectional view in FIG. 11 is exaggerated for purposes of explaining the adhesive system, as the raised areas at the third layer in reality will not be present because the layers of adhesive are microscopically thin.

The adhesive system 112 for the label 110, which comprises two full layers 114 and 115 of adhesive and a third partial layer 116 in the form of rings at the outer periphery and at the periphery of the inner hole or opening of the disc, consists of a repositionable acrylic-based adhesive made by the Standard Register Corporation. However, any suitable adhesive matched to the substrate and which is repositionable may be used. These layers of adhesive are successively applied by an anilox roll. Application of each layer may be referred to as a bump of adhesive. After each layer or coating of adhesive is applied, it is suitably air-dried.

In as much as an anilox roll may have different line screens, a chosen line screen is used for each coating or bump of adhesive. Preferably, the first coating of adhesive, which is the layer 114, is applied with an anilox No. 80 roll. This layer is applied to the entire surface of the writeable substrate 111 and cured. The second coating or bump of adhesive is applied with an anilox No. 120 roll and cured. Finally, the third coating or bump 116, which is at the periphery of the writeable substrate and at the central opening, is applied with an anilox No. 200 roll. Again, after each coating or bump is applied by an anilox roll, it is cured by subjecting the coating to a drying step.

Accordingly, the adhesive system 112 includes one or more layers or coatings or bumps of adhesive over the entire undersurface of the writeable substrate and an additional patterned layer of adhesive at the outer periphery and the periphery of the opening in the central part of the substrate. The multiple layers of adhesive provide a stronger bond between the writeable substrate or label and the laser disc that resists peeling under normal handling of the disc. However, the repositionable adhesive allows removal of the writeable substrate without causing any tearing of the substrate, and also without leaving any substantial adhesive residue on the surface of the laser disc. This facilitates the application of a replacement label. Thus, a new label can be effectively mounted on the laser disc and which will lie completely flat and thereafter resist separation during normal handling of the disc.

It will be appreciated that a liner will be applied over the adhesive side of the label to facilitate shipping, as described above with the previous embodiments. This liner is then peeled from the label when it is to be applied to a disc. Further, the labels may be made in sheet form, as above described.

It will be understood that modifications and variations may be effected without departing from the scope of the novel concepts of the present invention, but it is understood that this application is to be limited only by the scope of the appended claims.

The invention is hereby claimed as follows:

1. An optical disc label for substantially covering the label side of an optical disc having a label side and a play side, said label comprising:

a sheet of substantially opaque, writeable or printable material having a center hole to substantially match the center hole of the disc and sized to substantially cover said label side of said disc, wherein said sheet of material has a top side and a bottom side, and said top side being capable of receiving indicia thereon;

and a repositionable adhesive system on the bottom side of said label for adhesively attaching said label to the label side of the disc so as to dispose the label flush with the disc, said adhesive system including at least one layer of adhesive over the entire label, and at least one additional layer of adhesive over said one layer patterned as an inner ring at the center hole and an outer ring at the periphery.

2. The optical disc label of claim 1, wherein said adhesive system further includes another layer of adhesive over said one layer of adhesive and onto which the patterned layers of adhesive is applied.

3. The optical label of claim 2, wherein each layer of adhesive is cured prior to the application of the next layer of adhesive.

4. The optical disc label of claim 3, wherein the one layer of adhesive is applied with an anilox No. 80 roll, the an other layer of adhesive with an anilox No. 120 roll, and the patterned layer of adhesive with an anilox No. 200 roll.

5. The optical disc label of claim 2, wherein said optical disc label further includes means on the top side of said label for indicating where to apply indicia.

6. The optical disc label of claim 2, which further includes a removable liner on said bottom side of said label to protect said adhesive layers prior to application on an optical disc.

7. The optical disc label of claim 6, wherein said removable liner is made of a printable material on the side opposite the side receiving the label.

8. The optical disc label of claim 6, wherein the liner is coated with a release material in the areas engaged by the adhesive of the label.

9. The optical disc label of claim 8, wherein the release material is silicone.

10. The optical disc label of claim 1, wherein the patterned layer of adhesive further includes a plurality of radially arranged areas between said outer ring and said center ring.

* * * * *